US008069276B2

(12) United States Patent
Kang et al.

(10) Patent No.: US 8,069,276 B2

(45) Date of Patent: Nov. 29, 2011

(54) IMAGE DISPLAY DEVICE AND METHOD OF CHANGING FIRST INFORMATION WITH SECOND EDID INFORMATION WHEREIN EACH EDID INFORMATION IS STORED ON DIFFERENT STORAGE UNITS

(75) Inventors: Ho-woong Kang, Yongin-si (KR); Il-doo Kim, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 132 days.

(21) Appl. No.: 12/025,946

(22) Filed: Feb. 5, 2008

(65) Prior Publication Data

US 2009/0058868 A1 Mar. 5, 2009

(30) Foreign Application Priority Data

Sep. 3, 2007 (KR) ........................ 10-2007-0088934

(51) Int. Cl.
*G09G 5/00* (2006.01)
*G06F 13/00* (2006.01)

(52) U.S. Cl. .................... 710/10; 710/8; 710/9; 710/16; 710/17; 710/18; 710/19; 713/1; 713/2; 345/1.1; 345/1.3; 345/581

(58) Field of Classification Search ................ 710/8–10, 710/16–19; 713/1, 2; 725/50, 132; 345/1.1, 345/1.3
See application file for complete search history.

(56) References Cited

U.S. PATENT DOCUMENTS

| | | | | |
|---|---|---|---|---|
| 5,654,738 | A * | 8/1997 | Spurlock | 345/699 |
| 5,943,029 | A * | 8/1999 | Ross | 345/11 |
| 6,081,891 | A * | 6/2000 | Park | 713/2 |
| 6,223,283 | B1 * | 4/2001 | Chaiken et al. | 713/1 |
| 6,300,980 | B1 * | 10/2001 | McGraw et al. | 348/552 |
| 6,618,773 | B1 * | 9/2003 | Chang et al. | 710/16 |
| 6,839,055 | B1 * | 1/2005 | Nguyen | 345/204 |
| 7,079,128 | B2 * | 7/2006 | Kim | 345/213 |
| 7,242,370 | B2 * | 7/2007 | Ouchi et al. | 345/1.3 |
| 7,358,928 | B2 * | 4/2008 | Mori et al. | 345/1.1 |

(Continued)

FOREIGN PATENT DOCUMENTS

JP 2006119399 5/2006

(Continued)

OTHER PUBLICATIONS

Partial European Search Report issued Sep. 30, 2009 in EP Application No. 08153621.1.

*Primary Examiner* — Tammara Peyton

(74) *Attorney, Agent, or Firm* — Stanzione & Kim, LLP

(57) ABSTRACT

An image display device and method of changing extended display identification data (EDID) information includes a first storage unit which stores extended display identification data (EDID) information to be provided to the source providing device, a second storage unit which stores at least one version of the EDID information which is different from the EDID information stored in the first storage unit, and a control unit which replaces the EDID information stored in the first storage unit with the different version of the EDID information stored in the second storage unit if an EDID information change request signal is input. Accordingly, compatibility of the EDID information between the source providing device and the image display device can be maintained.

29 Claims, 3 Drawing Sheets

U.S. PATENT DOCUMENTS

| | | | | |
|---|---|---|---|---|
| 7,366,886 | B2 * | 4/2008 | Yoo | 713/1 |
| 7,421,573 | B2 * | 9/2008 | Kim | 713/1 |
| 7,818,556 | B2 * | 10/2010 | Iima et al. | 713/1 |
| 2002/0152467 | A1 * | 10/2002 | Fiallos | 725/50 |
| 2005/0030300 | A1 | 2/2005 | Tseng | |
| 2005/0080939 | A1 | 4/2005 | Onuma et al. | |
| 2005/0120384 | A1 | 6/2005 | Stone et al. | |

FOREIGN PATENT DOCUMENTS

| | | |
|---|---|---|
| JP | 2007206598 | 8/2007 |

* cited by examiner

IMAGE DISPLAY DEVICE AND METHOD OF CHANGING FIRST INFORMATION WITH SECOND EDID INFORMATION WHEREIN EACH EDID INFORMATION IS STORED ON DIFFERENT STORAGE UNITS

CROSS-REFERENCE TO RELATED APPLICATIONS

This application claims priority under 35 U.S.C. §119 (a) from Korean Patent Application No. 10-2007-0088934, filed on Sep. 3, 2007, in the Korean Intellectual Property Office, the disclosure of which is incorporated herein by reference in its entirety.

BACKGROUND OF THE INVENTION

1. Field of the Invention

The present general inventive concept relates to an image display device and a method of changing extended display identification data (EDID) information thereof. More particularly, the present general inventive concept relates to an image display device which is capable of changing EDID information to make a version of the EDID information of a source providing device consistent with a version of the EDID information of the image display device, and a method of changing EDID information thereof.

2. Description of the Related Art

Image display devices, such as televisions or computer monitors, which output image and sound signals can be connected to diverse source providing devices, such as set-top boxes, or digital versatile disc (DVD) players. If the image display device is connected to the source providing device, the source providing device provides image and sound signals to the image display device, and the image display device outputs the image and sound signals.

FIG. 1 is a block diagram of a conventional image display system having a source providing device 10 and an image display device 20.

In order for the conventional image display system to output sources, that is, image and sound signals, a source providing unit 12 of the source providing device 10 reproduces and transmits the sources to the image display device 20 through an interface unit 14. The image display device 20 receives and outputs the sources through an interface unit 21, a source processing unit 22 and an output unit 23 under the control of a control unit 25.

If the source providing device 10 and the image display device 20 are connected via a cable, a control unit 16 of the source providing unit 10 determines output signals optimized to the image display device 20 based on extended display identification data (EDID) information stored in a nonvolatile memory 24 of the image display device 20. The EDID information indicates monitor data information, including identification of a seller and a manufacturer, and a variable and properties for basic display.

For example, if a television is connected to a computer, the computer senses the EDID information of the television according to a plug-and-play feature and outputs image signals and sound signals suitable for the television.

In order for the source providing device 10 to sense the EDID information of the image display device 20, the image display device 20 stores the EDID information standardized to the feature of the image display device 20 in the nonvolatile memory 24 when being manufactured. The nonvolatile memory 24 stores EDID information of a single format only regardless of a size of a memory thereof.

As the technology of the image display device 20 and the source providing device 10 has developed and image signals and sound signals have become increasingly utilized, the configuration format of the EDID information has been complicated and sophisticated. Accordingly, the version of the EDID information has been frequently upgraded, so if the version of the EDID information supported in each device is different, there may be incompatibility between the devices.

For example, when a user wishes to connect a television to a DVD player, if the version of the EDID information in the two devices is different, the device having the earlier version may not be able to recognize the signal scheme or format of a device having the later version, or may malfunction.

Since the EDID information is stored in the nonvolatile memory 24 of the image display device 20 during the manufacturing process, users cannot change it. Therefore, if there is incompatibility between the EDID information in the image display device 20 and in the source providing device 10, the image display device 20 or the source providing device 10 needs to be replaced.

In particular, as general users cannot easily recognize the EDID information suitable for the image display device 20, it is difficult to select a suitable source providing device 10.

SUMMARY OF THE INVENTION

The present general inventive concept provides an image display device which stores a plurality of versions of EDID information and easily changes the EDID information to make the version of the EDID information of a source providing device consistent with the version of the EDID information of the image display device, and a method of changing EDID information thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image display device which is connected to a source providing device, the image display device including a first storage unit which stores extended display identification data (EDID) information to be provided to the source providing device, a second storage unit which stores at least one version of the EDID information which is different from the EDID information stored in the first storage unit, and a control unit which replaces the EDID information stored in the first storage unit with the different version of the EDID information stored in the second storage unit if an EDID information change request signal is input.

The image display device may further include an interface unit which supports interfacing between the image display device and the source providing unit, and a switch unit which switches between connection to the interface unit and the first storage unit.

The switch unit may disconnect the interface unit from the first storage unit and connect the control unit to the first storage unit if the EDID information change request signal is input.

The switch unit may disconnect the control unit to the first storage unit and reconnect the interface unit to the first storage unit if the EDID information stored in the first storage unit is replaced with the different version of the EDID information stored in the second storage unit.

The image display device may further include a user interface unit which provides a list of the at least one EDID information stored in the second storage unit so that a user can select one from the list, and receives the EDID information change request signal.

The user interface unit may provide an EDID information edition menu so that the user can edit the EDID information, and the control unit may store the EDID information edited using the EDID information edition menu in the first storage unit.

The image display device may further include an external communication interface unit which receives a new version of the EDID information through an external communication medium. The control unit may store the new version of EDID information received through an external communication interface unit in the second storage unit.

The image display device may further include a tuner unit which receives a new version of the EDID information in Over the Air (OTA) manner. The control unit may store the new version of EDID information received through the tuner unit in the second storage unit.

If the EDID information stored in the first storage unit is replaced with the different version of the EDID information stored in the second storage unit and the replaced EDID information includes an error, the control unit restores the replaced EDID information to the previous EDID information.

The foregoing and/or other aspects and utilities of the present general inventive concept may also be achieved by providing a method of changing extended display identification data (EDID) information in an image display device, the method including receiving an EDID information change request signal, and replacing the EDID information stored in a first storage unit with the different version of the EDID information stored in a second storage.

The method may further include disconnecting the source providing device from the first storage unit if the EDID information change request signal is input.

The method may further include reconnecting the source providing device to the first storage unit.

The method may further include providing a list of the at least one EDID information stored in the second storage unit so that a user can select one from the list.

The method may further include providing an EDID information edition menu so that the user can edit the EDID information, and storing the edited EDID information in the first storage unit.

The method may further include receiving a new version of the EDID information through an external communication medium, and storing the received new version of EDID information in the second storage unit.

The method may further include receiving a new version of the EDID information in Over the Air (OTA) manner, and storing the received new version of EDID information in the second storage unit.

The method may further include, if the EDID information stored in the first storage unit is replaced with the different version of the EDID information stored in the second storage unit and the replaced EDID information includes an error, restoring the replaced EDID to the previous EDID information.

The foregoing and/or other aspects and utilities of the present general inventive concept may also be achieved by providing a computer-readable medium to contain computer-readable codes as a program to execute a method of an image display device, the method including receiving an EDID information change request signal, and replacing EDID information stored in a first storage unit with a different version of the EDID information stored in a second storage according to the EDID information change request signal.

The foregoing and/or other aspects and utilities of the present general inventive concept may also be achieved by providing an image display device including a first storage unit to store first EDID information, a second storage unit to store second EDID information, and a control unit to control the first storage unit to replace the first EDID information with the second EDID information.

The first storage unit may be connectable to a first external device to transmit one or the first EDID information and the second EDID information to the first external device, and the second storage unit may be connectable to a second external device to receive the second EDID information from the second external device.

The first external device may include a source providing device to provide a source to be reproduced in the image display device.

The second external device may provide one of a new version and an edited version of the first EDID information to the second storage device as the second EDID information.

The first storage unit may be connectable to an external device to transmit the first EDID information to the external device, and may be disconnected from the external device and connected to the second storage unit to receive the second EDID information from the first storage unit such that the received second EDID information is transmitted to the external device as the first EDID information when the first storage unit is connected to an external device.

The control unit may be connected to the second storage unit when the second EDID information is different from the first EDID information, and may be connected to the first storage unit to update the first EDID information with the second EDID information.

The second storage unit may store a list of different EDID information, and the control units may control the second storage unit to output one of the list of different EDID information as the second EDID information.

The image display device may further include a switch unit to selectively connect one of the first storage unit and the second storage unit to the control unit such that the second EDID information is transmitted from the second storage unit to the first storage unit.

The image display device may further include a first power unit to supply a first power to the first storage unit, and a second power unit to supply a second power to the second storage unit, and the first storage unit may be supplied with the first power when the second storage unit is not supplied with the second power in one of a power off mode and a power saving mode.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
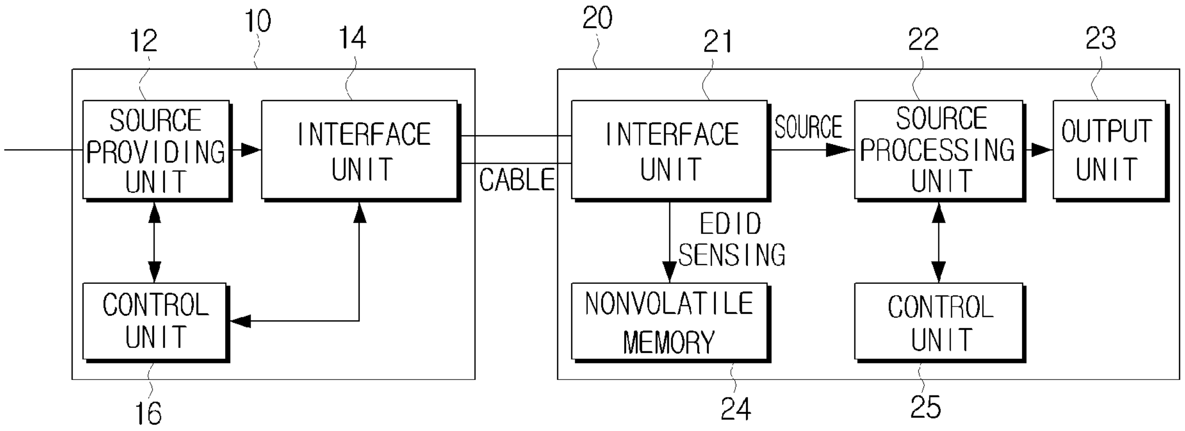
FIG. 1 is a block diagram illustrating a conventional image display system.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
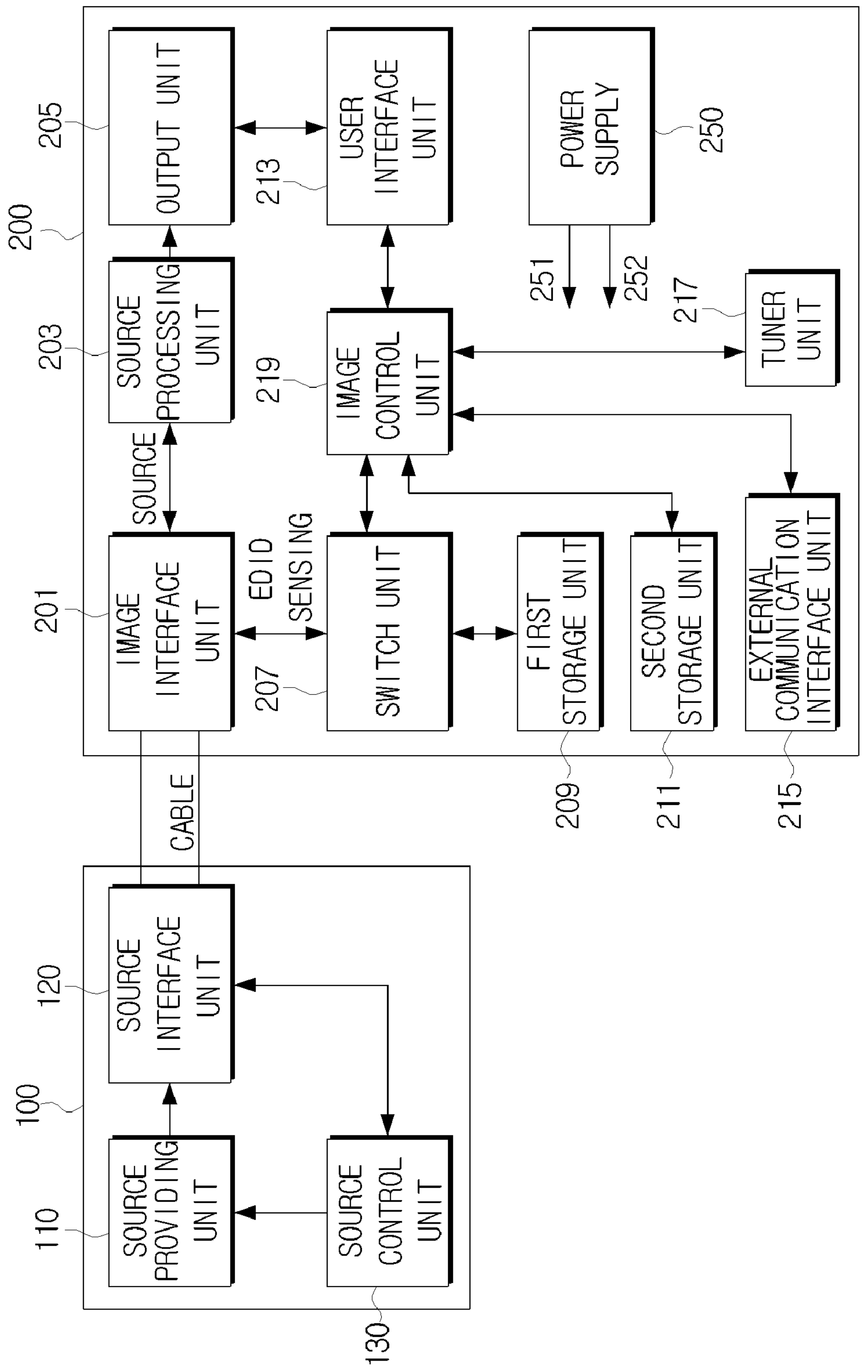
FIG. 2 is a block diagram illustrating an image display system according to an embodiment of the present general inventive concept.

FIG. 2 is a block diagram illustrating an image display system according to an embodiment of the present general inventive concept.

The image display system includes a source providing device 100 and an image display device 200. The source providing device 100 is a device to provide sources to the image display device 200, and may include a set-top box, a DVD player, a computer, etc. The image display device 200 is a device to output one or more signals corresponding to one or more sources provided from the source providing device 100, and may include a television, a monitor, etc. The sources include image signals and sound signals to correspond to an image output and a sound output to be reproduced in the image display device 200.

The source providing device 100 and the image display device 200 are connected via a cable which may be a high definition multimedia interface (HDMI) cable, but is not limited thereto. The source providing device 100 and the image display device 200 may be connected through a wireless or network connection.

The source providing device 100 and the image display device 200 have an individual interface for communication of signals therebetween. In this embodiment, an interface unit for the source providing device 100 is referred to as a source interface unit 120, and an interface unit for the image display device 200 is referred to as an image interface unit 201.

The source providing device 100 includes a source providing unit 110, a source interface unit 120, and a source control unit 130.

The source providing unit 110 reproduces or generates a source to be output using the image display device 200. The source reproduced by the source providing unit 110 is transmitted to the image display device 200 via the source interface unit 120.

The source interface unit 120 supports interfacing between the source providing device 100 and the image display device 200. The source interface unit 120 transmits the source reproduced by the source providing unit 110 to the image display device 200, and receives EDID information stored in the image display device 200 100 if the source providing device 100 and the image display device 200 are connected. The EDID information represents monitor data information which identifies a seller and a manufacturer of the image display device 200, and variables and properties of a basic display of the image display device 200.

The source control unit 130 controls an overall operation of the source providing device 100. In more detail, the source control unit 130 controls signal input and output between the source providing unit 110 and the source interface unit 120.

If a source reproduction request signal is input by a user, the source control unit 130 operates the source providing unit 110 to reproduce a corresponding source, and operates the source interface unit 120 to transmit the source to the image display device 200.

In addition, if the source providing device 100 is connected to the image display device 200 via the cable, the source control unit 130 operates the source interface unit 120 to receive (obtain) the EDID information stored in the image display device 200 regardless of whether the image display device 200 is turned on or off. Consequently, the source control unit 130 determines an optimal output state suitable for the image display device 200, and provides information on the determined optimal output state to the source providing unit 110.

If the optimal output state is determined, the source providing unit 110 reproduces and outputs the source according to the optimal output state.

The image display device 200 includes an image interface unit 201, a source processing unit 203, an output unit 205, a switch unit 207, a first storage unit 209, a second storage unit 211, a user interface unit 213, an external communication interface unit 215, a tuner unit 217, and an image control unit 219.

The image interface unit 201 supports interfacing between the image display device 200 and the source providing device 100. That is, the image interface unit 201 receives a source from the source providing device 100 connected via the cable, and transmits the EDID information stored in the first storage unit 209 to the source providing device 100 via the cable.

The source processing unit 203 receives the source from the image interface unit 201, decodes the source, and converts the source into a format which can be output through the output unit 205.

The output unit 205 outputs the source processed by the source processing unit 203. As the source includes an image signal and a sound signal, the output unit 205 may include an image signal output unit, such as a liquid crystal display (LCD) panel or a plasma display panel (PDP), and a sound signal output unit, such as a speaker.

The switch unit 207 switches between a first connection between the image interface unit 201 and the first storage unit 209, and a second connection between the image control unit 219 and the first storage unit 209. If the source providing device 100 is connected to the image display device 200, the source providing device 100 receives the EDID information of the image display device 200 regardless of whether the image display device 200 is turned on or off, so the switch unit 207 usually connects the image interface unit 201 and the first storage unit 209 except in an unusual situation.

If an EDID information change request signal is input, the switch unit 207 disconnects the image interface unit 201 from the first storage unit 209, and connects the image control unit 219 to the first storage unit 209.

In addition, if the EDID information stored in the first storage unit 209 is replaced with EDID information stored in the second storage unit 211, the switch unit 207 disconnects the image control unit 219 from the first storage unit 209, and reconnects the image interface unit 201 to the first storage unit 209.

The first storage unit 209 stores the EDID information to be provided to the source providing device 100. When the source providing device 100 is connected to the image display device 200 via the cable, the source providing device 100 uses the EDID information stored in the first storage unit 209 to determine the EDID information of the image display device 200, that is, to determine output features of the image display device 200. The EDID information stored in the first storage unit 209 is provided to the source providing device 100 regardless of whether the image display device 200 is turned on or off.

The first storage unit 209 stores only one version of the EDID information, and is usually connected to the image interface unit 201 by the switch unit 207, except in unusual situations, in order to provide the EDID information to the source providing device 100 regardless of whether the image display device is turned on or off. The first storage unit 209 is an element corresponding to the nonvolatile memory 24 in the conventional image display device 20 of FIG. 1.

The second storage unit 211 stores at least one version of EDID information, which is different from the EDID information stored in the first storage unit 209, as well as the EDID information stored in the first storage unit 209. For example, if the source providing device 100 and the image display device 200 support the HDMI, the EDID information varies according to an HDMI format. Accordingly, the second storage unit 211 stores different versions of EDID information, such as version 1.1, 1.2, or 1.3. That is, the second storage unit 211 stores a plurality of versions of EDID information. At least one of the plurality of versions of the EDID information is stored in the second storage unit 211 may be suitable for the source process and/or the output unit 205 to process and/or reproduce the source at the optimal output state.

The user interface unit 213 provides the user with a list of at least one version of the EDID information stored in the second storage unit 211 so that the user can select one from the list. The list of EDID information can be displayed when the user wishes to change the EDID information provided to the source providing device 100. The list of EDID information provided by the user interface unit 213 is displayed using the output unit 205.

If the user selects one version of the EDID information from the list, the user interface unit 213 receives an EDID information change request signal for the selected EDID information, and the EDID information change request signal is thus input to the image control unit 219.

The user interface unit 213 may provide an EDID information edition menu so that the user can edit a portion of the EDID information. For example, if the source providing device 100 provides a maximum resolution level of 1080i and the image display device 200 provides a maximum resolution level of 1080p, the source providing device 100 outputs a source at a resolution level of 1080i based on the sensed EDID information. However, if the user determines that a resolution level of 720p is more appropriate than 1080p, the user can modify the resolution level of the image display device 200 from 1080p to 720p using the EDID information edition menu which is provided by the user interface unit 213. If the EDID information is modified, the source providing device 100 determines an optimal output state using the modified EDID information. The modified EDID information can be stored in the second storage unit 211 and/or transmitted to the first storage unit 209, and then transmitted to the source providing device 100.

Furthermore, an HDMI mode or a digital video interactive (DVI) mode may be selected using the EDID information edition menu which is provided by the user interface unit 213. For example, if an error occurs when being output in an HDMI mode, or if the user wishes to use the image display device 200 in a DVI mode, a DVI mode may be selected using the EDID information edition menu. Such cases are based on the source providing device 100 and the image display device 200 to support both an HDMI mode and a DVI mode. The EDID information corresponding to the HDMI mode or the DVI mode can be stored in the second storage unit 211 and/or transmitted to the first storage unit 209, and then transmitted to the source providing device 100.

The external communication interface unit 215 receives a new version of EDID information through an external communication medium which may be an external storage medium such as a universal serial bus (USB), or a network such as the Internet.

The tuner unit 217 receives a broadcast signal and a new version of EDID information in the Over the Air (OTA) manner, which indicates a wireless networking technology and is used to transmit or receive information regarding applications in a wireless communication system.

The image control unit 219 controls the overall operation of the image display device 200. In more detail, the image control unit 219 controls signal input and output between the image interface unit 201, the source processing unit 203, the output unit 205, the switch unit 207, the first storage unit 209, the second storage unit 211, the user interface unit 213, the external communication interface unit 215, and the tuner unit 217.

If an EDID information change request signal is input through the user interface unit 213, the image control unit 219 replaces the EDID information stored in the first storage unit 209 with a different version of EDID information stored in the second storage unit 211. Because the second storage unit 211 stores a plurality of pieces of EDID information, the image control unit 219 replaces the EDID information stored in the first storage unit 209 with one of the EDID information stored in the second storage unit 211 according to the EDID information change request signal.

In order to perform the replacement, the image control unit 219 operates the switch unit 207 to disconnect the image interface unit 201 from the first storage unit 209, and connect the image control unit 219 to the first storage unit 209.

If the switch unit 207 connects the image control unit 219 to the first storage unit 209, the image display device 200 is disconnected from the source providing device 100, so the source providing device 100 cannot sense the EDID information of the image display device 200.

After the image control unit 219 is connected to the first storage unit 209 through the switch unit 207, the image control unit 219 reads out the EDID information corresponding to the EDID information change request signal in the second storage unit 211, and stores the read-out EDID information in the first storage unit 209. The EDID information, which is previously stored in the first storage unit 209, is deleted or replaced with modified EDID information of the second storage unit 211.

After the image control unit 219 stores the different or new version of EDID information in the first storage unit 209, the image control unit 219 operates the switch unit 207 to disconnect the image control unit 219 from the first storage unit 209, and reconnect the image interface unit 201 to the first storage unit 209. Consequently, the source providing device 100 can sense the EDID information of the image display device 200.

After the EDID information stored in the first storage unit 209 is replaced with the different version of EDID information stored in the second storage unit 211, if the replaced EDID information has an error, the image control unit 219 restores the replaced EDID information to the previous EDID information.

If a new version of EDID information is received through the external communication interface unit 215 and the tuner unit 217, the image control unit 219 stores the received new version of EDID information in the second storage unit 211. Therefore, the second storage unit 211 stores the latest version of EDID information as well as previous versions of EDID information.

If the user edits the EDID information using the EDID information edition menu, the image control unit 219 stores the edited EDID information in the first storage unit 209. Accordingly, the source providing device 100 determines the optimal output state of the image display device 200 based on the EDID information edited by the user.

The image display device 200 may include a power supply 250 to supply a first power 251 and a second power 252 to components thereof. It is possible that the first power is supplied to the first storage unit 209, the switch unit 207 and the image interface unit 201 when the image display device 200 is in a power off mode or a power saving mode such that the second power is not supplied to corresponding components. Accordingly, the EDID information of the image display device 200 can be transmitted to the source providing device 100 when the image display device 200 is the power off mode or the power saving mode.

Figure 3:
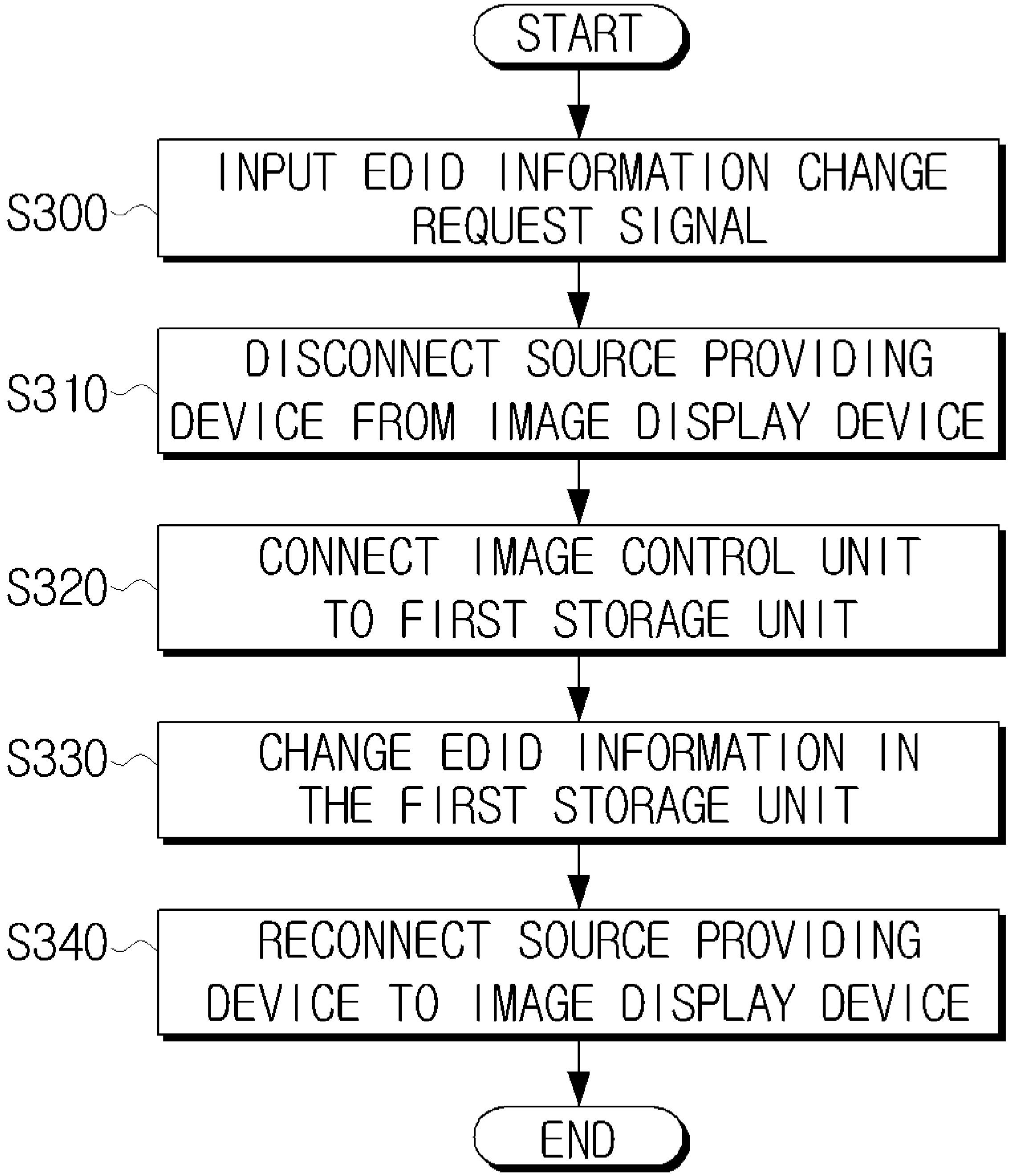
FIG. 3 is a flow chart illustrating a method of changing EDID information of an image display device according to an embodiment of the present general inventive concept.

FIG. 3 is a flow chart illustrating a method of changing EDID information of an image display device according to an embodiment of the present general inventive concept.

Referring to FIGS. 2 and 3, in the method of changing EDID information of the image display device 200 according to an embodiment of the present general inventive concept, it is assumed that the first storage unit 209 stores currently used EDID information, and the second storage unit 211 stores a plurality of versions of EDID information in addition to the EDID information stored in the first storage unit 209. The plurality of versions of EDID information may include a new version or an edited version of EDID information received from an external device connected to the image display device 200 through, for example, the external communication interface unit 215.

If the currently used EDID information needs to be changed, the user selects a menu to change the EDID information using a remote control (not illustrated) or a key input unit (not illustrated). Accordingly, the user interface unit 213 provides a list of the plurality of versions of EDID information stored in the second storage unit 211 so that the user can select one on the list. Subsequently, in operation S300, the user inputs an EDID information change request signal using the list displayed on the output unit 205. A situation in which the EDID information needs to be changed is when versions of EDID information between the source providing device 100 and the image display device 200 are different, and thus image signals or sound signals are not output.

If the EDID information change request signal is input through the user interface unit 213, the switch unit 207 disconnects the image interface unit 201 from the first storage unit 209. As a result, in operation S310, the source providing device 100 is disconnected from the image display device 200.

In operation S320, the switch unit 207 connects the image control unit 219 to the first storage unit 209, so the image control unit 219 can change the EDID information stored in the first storage unit 209.

In operation S330, the image control unit 219 reads out EDID information corresponding to the EDID information change request signal from the second storage unit 211, and replaces the EDID information pre-stored in the first storage unit 209 with the read-out EDID information.

Subsequently, in operation S340, the switch unit 207 reconnects the image interface unit 201 to the first storage unit 209, so the source providing device 100 can sense the EDID information of the image display device 200.

As a result, the source providing device 100 senses the replaced EDID information stored in the first storage unit 209. That is, the source providing device 100 can use only the EDID information stored in the first storage unit 209 when sensing the EDID information of the image display device 200.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

As described above, the present general inventive concept provides an image display device which stores diverse versions of EDID information and easily changes the EDID information to make the version of the EDID information of a source providing device consistent with the version of the EDID information of the an image display device, so incompatibility of the EDID information between the source providing device and the image display device can be resolved.

In addition, the source providing device and the image display device can share the latest EDID information by updating the EDID information using an external communication medium or update service provided from a broadcasting station.

What is claimed is:

1. An image display device which is connectable to a source providing device, the image display device comprising:

a first storage unit which stores extended display identification data (EDID) information to be provided to the source providing device;

a second storage unit which stores at least one version of the EDID information which is different from the EDID information stored in the first storage unit; and a control unit which replaces the EDID information stored in the first storage unit with the different version of the EDID information stored in the second storage unit such that the different version of the EDID information is stored in the first storage unit if an EDID information change request signal is input.

2. The image display device of claim 1, further comprising:

an interface unit which supports interfacing between the image display device and the source providing device; and a switch unit which switches a connection between the interface unit and the first storage unit.

3. The image display device of claim 2, wherein the switch unit disconnects the interface unit from the first storage unit and connects the control unit to the first storage unit if the EDID information change request signal is input.

4. The image display device of claim 3, wherein the switch unit disconnects the control unit to the first storage unit and reconnects the interface unit to the first storage unit if the EDID information stored in the first storage unit is replaced with the different version of the EDID information stored in the second storage unit.

5. The image display device of claim 1, further comprising:

a user interface unit which provides a list of the at least one EDID information stored in the second storage unit so that a user can select one from the list, and receives the EDID information change request signal.

6. The image display device of claim 5, wherein:

the user interface unit provides an EDID information edition menu so that the user can edit the EDID information; and the control unit stores the EDID information edited using the EDID information edition menu in the first storage unit.

7. The image display device of claim 1, further comprising:

an external communication interface unit which receives a new version of the EDID information through an external communication medium, wherein the control unit stores the new version of EDID information received through an external communication interface unit in the second storage unit.

8. The image display device of claim 1, further comprising:

a tuner unit which receives a new version of the EDID information in Over the Air (OTA) manner, wherein the control unit stores the new version of EDID information received through the tuner unit in the second storage unit.

9. The image display device of claim 1, wherein if the EDID information stored in the first storage unit is replaced with the different version of the EDID information stored in the second storage unit, and an error occurs in the replaced EDID information, the control unit restores the replaced EDID information to the previous EDID information.

10. A method of changing extended display identification data (EDID) information in an image display device, the method comprising:

receiving an EDID information change request signal; and replacing EDID information stored in a first storage unit with a different version of the EDID information stored in a second storage according to the EDID information change request signal such that the different version of the EDID information is stored in the first storage unit.

11. The method of claim 10, further comprising:

disconnecting the source providing device from the first storage unit if the EDID information change request signal is input.

12. The method of claim 11, further comprising:

reconnecting the source providing device to the first storage unit.

13. The method of claim 10, further comprising:

providing a list of the at least one EDID information stored in the second storage unit so that a user selects one from the list.

14. The method of claim 10, further comprising:

providing an EDID information edition menu so that a user edits the EDID information; and storing the edited EDID information in the first storage unit.

15. The method of claim 10, further comprising:

receiving a new version of the EDID information through an external communication medium; and storing the received new version of EDID information in the second storage unit.

16. The method of claim 10, further comprising:

receiving a new version of the EDID information in Over the Air (OTA) manner; and storing the received new version of EDID information in the second storage unit.

17. The method of claim 10, further comprising:

if the EDID information stored in the first storage unit is replaced with the different version of the EDID information stored in the second storage unit and the replaced EDID information includes an error, restoring the replaced EDID to the previous EDID information.

18. A computer-readable medium to contain computer-readable codes as a program to execute a method of an image display device, the method comprising:

receiving an EDID information change request signal; and replacing EDID information stored in a first storage unit with a different version of the EDID information stored in a second storage according to the EDID information change request signal such that the different version of the EDID information is stored in the first storage unit, wherein at least one of the receiving operation and replacing operation is executed by a control module.

19. An image display device comprising:

a first storage unit to store first EDID information;

a second storage unit to store second EDID information; and a control unit to control the first storage unit to replace the first EDID information with the second EDID information such that the different version of the EDID information is stored in the first storage unit.

20. The image display device of claim 19, wherein:

the first storage unit is connectable to a first external device and transmits one or the first EDID information and the second EDID information to the first external device; and the second storage unit is connectable to a second external device and receives the second EDID information from the second external device.

21. The image display device of claim 20, wherein the first external device comprises a source providing device to provide a source to be reproduced in the image display device.

22. The image display device of claim 20, wherein the second external device provides one of a new version and an edited version of the first EDID information to the second storage device as the second EDID information.

23. The image display device of claim 19, wherein the first storage unit is connectable to an external device to transmit the first EDID information to the external device, and is disconnected from the external device and connected to the second storage unit to receive the second EDID information from the first storage unit such that the received second EDID information is transmitted to the external device as the first EDID information when the first storage unit is connected to an external device.

24. The image display device of claim 19, wherein the control unit is connected to the second storage unit when the second EDID information is different from the first EDID information, and is connected to the first storage unit to update the first EDID information with the second EDID information.

25. The image display device of claim 19, wherein the second storage unit stores a list of different EDID information, and the control units controls the second storage unit to output one of the list of different EDID information as the second EDID information.

26. The image display device of claim 19, further comprising:

a switch unit to selectively connect one of the first storage unit and the second storage unit to the control unit such that the second EDID information is transmitted from the second storage unit to the first storage unit.

27. The image display device of claim 19, further comprising:

a first power unit to supply a first power to the first storage unit; and a second power unit to supply a second power to the second storage unit, wherein the first storage unit is supplied with the first power when the second storage unit is not supplied with the second power in one of a power off mode and a power saving mode.

28. An image display device connectable to an image source device, comprising:

a storage unit to store extended display identification data (EDID) information; and a controller to receive a change request from the image source device, and to replace the stored EDID information with a different version of EDID information stored in a second storage unit according to the change request that is based on at least one different version of EDID stored in the second storage unit such that the at least one different version of EDID information is stored in the first storage unit.

29. An image display device which is connectable to a source providing device, the image display device comprising:

a first storage unit which stores extended display identification data (EDID) information to be provided to the source providing device;

a user interface unit that lists of the at least one EDID information stored in a second storage unit that stores at least one version of the EDID information which is different from the EDID information stored in the first storage unit; and a control unit which replaces the EDID information stored in the first storage unit with the different version of the EDID information stored in the second storage unit such that the different version of the EDID information is stored in the first storage unit in response to a selection of the at least one different version of the EDID included in the list of the user interface unit.

* * * * *